United States Patent [19]

Haarer et al.

[11] Patent Number: 5,858,585
[45] Date of Patent: *Jan. 12, 1999

[54] PROCESS FOR INTENSIFYING INFORMATION IN PHOTO-ADDRESSABLE SIDE-CHAIN POLYMERS

[75] Inventors: Dietrich Haarer, Bayreuth; Thomas Bieringer, Bindlach; Claus Dieter Eisenbach, Sindelfingen; Karl Fischer, Mainz; Ralf Ruhmann, Berlin; Roland Wuttke, Bayreuth; Joachim Stumpe, Berlin; Thomas Fischer, Berlin; Lutz Läser, Berlin; Michael Rutloh, Berlin; Uwe Claussen, Leverkusen, all of Germany

[73] Assignee: Bayer Aktiengesellschaft, Leverkusen, Germany

[*] Notice: This patent issued on a continued prosecution application filed under 37 CFR 1.53(d), and is subject to the twenty year patent term provisions of 35 U.S.C. 154(a)(2).

[21] Appl. No.: 793,559
[22] PCT Filed: Sep. 1, 1995
[86] PCT No.: PCT/EP95/03431
 § 371 Date: Feb. 28, 1997
 § 102(e) Date: Feb. 28, 1997
[87] PCT Pub. No.: WO96/08007
 PCT Pub. Date: Mar. 14, 1996

[30] Foreign Application Priority Data

Sep. 7, 1994 [DE] Germany .......... 44 31 823.5

[51] Int. Cl.$^6$ ...................... G03C 5/56
[52] U.S. Cl. .............. 430/20; 430/290; 430/330
[58] Field of Search .............. 430/20, 290, 330, 430/350, 270.14

[56] References Cited

U.S. PATENT DOCUMENTS

| | | | |
|---|---|---|---|
| 5,019,476 | 5/1991 | Kanno et al. | 430/20 |
| 5,023,859 | 6/1991 | Eich et al. | 365/113 |
| 5,098,978 | 3/1992 | Riepl et al. | 528/15 |
| 5,173,381 | 12/1992 | Natansohn et al. | 430/19 |
| 5,426,009 | 6/1995 | Coates et al. | 430/20 |
| 5,543,267 | 8/1996 | Stumpe et al. | 430/290 |

FOREIGN PATENT DOCUMENTS

| | | |
|---|---|---|
| 0474473 | 3/1992 | European Pat. Off. . |
| 276297 | 2/1990 | Germany . |
| 4339862 | 10/1994 | Germany . |
| 2248963 | 4/1992 | United Kingdom . |

OTHER PUBLICATIONS

Optical Computing and Processing, vol. 1 No. 1, Bowry et al. pp. 13–21 (Jan. 1991).

V.M. Emmelius, et al., Materialien für die optische Datenspeicherung, Angewandte Chemie, Heft 11, pp. 1475–1632, (1989).

T.N. Gerasimova, et al., Organic dyes for constant memory optical discs, Russian Chemical Reviews, 61, (1), (1992).

S.G. Kostromin et al., Thermotropic liquid–crystalline polymers XXVI Synthesis of comb–like polymers with oxygen containing spacers and a study of their phase transitions, Liquid Crystals, vol.2, No. 2, pp. 195–200, (1987).

H. Ringsdorf, et al., Electro–optical effects of azo–dye containing liquid crystalline copolymers, Makromol. Chem., 185, pp. 1327–1334, (1984).

V.P. Shibaev, et al., Thermotropic liquid–crystalline polymere–VI*, Eur. Polym. J., vol. 18, pp. 651–659, (1982).

J. Stumpe, et al., Photoinduced reorientation and optical anisotropy in films of photochromic liquid crystalline polymers by angular–dependent photoselection.

Vollmer, pp. 406–410.

*Primary Examiner*—John A. McPherson
*Attorney, Agent, or Firm*—Sprung Kramer Schaefer & Briscoe

[57] ABSTRACT

The light-induced modification in a side-chain polymer containing at least one side group whose configuration can be modified induced by light and at least one permanently shape-anisotropic side group can be amplified by warming to a temperature between the glass transition temperature and the clearing point. This effect opens up new aspects for optical data storage.

4 Claims, No Drawings

PROCESS FOR INTENSIFYING INFORMATION IN PHOTO-ADDRESSABLE SIDE-CHAIN POLYMERS

The invention relates to a process for amplifying information generated by changing the configuration of side groups in polymers by means of high-energy light. The process according to the invention allows the original intensity of an image, which is partially lost at the end of the writing operation, to be restored or even increased.

One possible way of optical data storage uses laser light for generating images by thermal destruction of organic layers (M. Emmelius, G. Pawlowski, H. J. Vollmann, Angew. Chem. 101, 1475–1502 (1989); T. N. Gerasimova, V. V. Shelkovnikov, Russ. Chem. Rev. 61, 55–66 (1992)).

A disadvantage of this method is the limited scope for modifying and erasing images once written.

Another possible way of optically storing information is to irradiate polymers containing side groups, which change their configuration on exposure to light. Such "photoaddressable" polymers are known in principle: for example, WO 93/3073 describes homopolymers containing azobenzene side groups, EP-A 333 022 describes cholesteric liquid-crystalline polymers, EP-A 369 432 describes liquid crystalline polymers and DE-A 38 10 722 describes amorphous polymers which are suitable for optical information storage. When the irradiation is complete, however, the light-induced modification of the irradiated zones drops, the degree of this drop naturally depending, inter alia, on the polymer type, leaving at best a small residue of the induced modification which is stable for an extended period. When the temperature is raised above the glass transition temperature Tg of the polymer, the residual modification is said to be further reduced and disappears completely when the clearing point is reached (J. Stumpe, L. Müller, L. Läisker, D. Kreysig, G. Hauck, H. D. Koswig, S. Kostromin, V. Shibaev; Proceedings of the 20th Freiburg Congress on Liquid Crystals 1991).

Surprisingly, it has now been found that the effect remaining at the end of the writing operation and after relaxation of the light-induced modification can be re-amplified if the polymer is warmed to a temperature which is below the clearing point and in the region of the glass transition temperature Tg. The effect according to the invention can in fact be detected below the glass transition temperature, but is only achieved within a time span of practical interest above the Tg.

The invention thus relates to a process for amplifying the light-induced modification in a side-chain polymer by warming to a temperature between the glass transition temperature and the clearing point.

The clearing point is defined as the temperature at which the nematic into the isotropic phase. It can be measured by DSC analysis (2nd heating curve, 10° C./minute). The assignment of the phase types can be deduced by comparison with known data from X-ray diffraction analysis of the homopolymers.

Examples of so-called side-group polymers which are suitable for the process according to the invention are described in the earlier German Patent Application P 43 39 862.6. In the glass state before irradiation, they should be optically isotropic, transparent, non-scattering and amorphous and after irradiation they should be transparent and semipermanently birefringent and dichroic owing to light-induced alignment of the side groups which is reversible in the glass state (the term "amorphous" for the purposes of the invention also includes states containing microdomains which are so small that they cannot be detected; this is generally the case if their diameter is less than $\frac{1}{20}$ of the wavelength of light). They have a main chain which acts as backbone and covalently bonded side-groups branching off from this and have the following features:

(1) the side-group polymer contains at least one side group whose configuration can be changed induced by a light;

(2) the side-group polymer contains at least one permanently shape-anisotropic side group, other than (1), having high anisotropy of the molecular polarizability;

(3) the side-group polymer contains flexible spacer groups between the main chain and the side groups (1) and (2).

Examples of groups whose configuration can be changed induced by light are groups containing double bonds whose cis- and trans-configurations can be converted into one another by exposure to light. These groups may additionally have high, but non-permanent molecular shape anisotropy.

Examples of groups which are permanently shape-anisotropic are groups which have a rigid, rod-like molecular shape, for example bisphenyl groups, benzanilide groups and phenyl benzoate groups.

The formation of liquid-crystalline ordered states becomes impossible in thermodynamic terms if the side-group polymers contain one or more structural features (4) from groups (a) to (g):

(a) at least two types of spacer groups (3) of different length are incorporated;

(b) at least some of the spacer groups (3) contain hetero atoms, (c) at least some of the spacer groups (3) have branches;

(d) at least some of the side groups (1) or (2) have branches;

(e) at least some of the side groups (1) or (2) terminate in branched end groups;

(f) at least some of the monomer units of the side-group polymer do not form liquid-crystalline phases;

(g) the side-group polymer contains a further side group (5) which does not have permanent shape anisotropy.

Preferred side-chain polymers contain the structural units 1 to 2 having high molecular shape anisotropy and high anisotropy of the molecular polarizability, but the tendency to form liquid-crystalline ordered states resulting from the shape anisotropy and other intermolecular interactions of the side groups is effectively suppressed by structural features a–g. They thus combine the good optical properties of amorphous films and their significantly simplified industrial production compared with liquid-crystalline monodomain films with high values for light-induced optical anisotropy, as were hitherto only known in monodomains of liquid-crystalline polymers.

In kinetic terms, the formation of liquid-crystalline ordered states in the side-chain polymers can be suppressed if the structural units a–g substantially reduce the ordering tendency of the polymers and the polymers have only low phase-transition enthalpies ($\Delta H<0.8$ J/g), or very strong intermolecular interactions of the side groups 1 and 2 (hydrogen bridging and/or CT interactions) suppress the formation of a light-scattering polydomain structure, or a high viscosity of the isotropic polymer films above the clearing point (for example in polymers containing short spacers or rigid polymer main chains) likewise suppresses the formation of the light-scattering liquid-crystalline polydomain structure, or the polymers are frozen by rapid cooling from the isotropic melt to the glass state to give optically isotropic, homogeneous, non-light-scattering, products.

The main chain of the side-group polymer is preferably formed by monomers which carry the side group (1) via a spacer group (3), by monomers which carry the side group (2) via spacer groups (3) and optionally by further monomers, where, in particular, the proportion of the monomers containing the side group (1) is from 25 to 80 mol %, preferably from 30 to 70 mol %, the proportion of monomers containing the side group (2) is from 20 to 75 mol %, preferably from 30 to 70 mol %, and the proportion of the further monomers is from 0 to 50 mol %, in each case based on the total of all incorporated monomer units. Suitable "further" recurring units are all units which can be incorporated chemically into the side-group polymer. They essentially serve merely to reduce the concentration of the side groups 1 and 2 in the polymer and thus cause as it were a "dilution" effect. In the case of poly(meth)acrylates, the "further" monomers include ethylenically unsaturated, copolymerizable monomers, preferably carrying α-substituted vinyl groups or β-substituted allyl groups, preferably styrene; but also, for example, ring-chlorinated and ring-alkylated or ring-alkylated styrenes, where the alkyl groups can contain 1 to 4 carbon atoms, such as, for example, vinyltoluene, divinylbenzene, α-methylstyrene, tert-butylstyrenes and chlorostyrenes; vinyl esters of carboxylic acids having 2 to 6 carbon atoms, preferably vinyl acetate; vinylpyridine, vinylnaphthalene, vinylcycloehxane, acrylic acid and methacrylic acid, and/or esters thereof, preferably vinyl, allyl and methallyl esters) having 1 to 4 carbon atoms in the alcohol component, and amides and nitriles thereof, maleic anhydride, maleic monoesters and maleic diesters having 1 to 4 carbon atoms in the alcohol component, maleic monoamides and diamides and cyclic imides, such as methylmaleiiuimide or N-cyclohexylmaleiimide; allyl compounds, such as allylbenzene and allyl esters, such as allyl acetate, diallyl phthalate, diallyl isophthalate, diallyl fumarate, allyl carbonates, diallyl carbonates, triallyl phosphate and triallyl cyanurate.

The side-group polymer preferably contains, as main chain, a poly(meth)acrylate, a polysiloxane, a polyolefin, a poly-α-oxirane, a polyether, a polyamide, a polyurethane, a polyester, a polysulphone or a polycarbonate, as side group (1), including the flexible spacer group (3), units of the formula (I), and as side group (2), including the flexible spacer group (3), units of the formula (II):

$$-S^1\text{-}Q^1\text{-}P\text{-}X^1 \qquad (I)$$

$$-S^2\text{-}Q^2\text{-}M\text{-}X^2 \qquad (II)$$

in which $S^1$ and $S^2$ are a spacer group, $Q^1$ and $Q^2$ are —O—, —CO—O—, —O—CO—, —CO—NR$^1$—, —NR$^1$—CO— or —NR$^1$—, P is a group whose configuration can be changed induced by light, M is a permanently shape-anisotropic group which is different from P, $X^1$ and $X^2$ are a terminal substituent, and $R^1$ is hydrogen or $C_1$–$C_4$-alkyl.

Preference is given to side groups in which $S^1$ and $S^2$ are a —(CH$_2$)$_n$- group which is optionally interrupted by —O—, —MH— or —Si(R$^5$)$_2$-, n is from 2 to 14, P is —Ar(N=N—Ar)$_m$-, —ArN=CR$^2$—Ar—, —Ar—CR$^2$=N—Ar—, —Ar—CR$^2$=CR$^3$—COOR$^4$—, —Ar—(CH=CH—Ar)$_m$, —ArCR$_2$=CR$_3$—Ar, —Ar—CR$^2$=CR$^3$—COR$^4$ or —Ar—CR$^2$=CR$^3$-cyclohexyl, $R^2$, $R^3$ and $R^4$ are H, $C_1$–$C_4$-alkyl, CN, OR$^5$, COOR$^5$, halogen, NO$_2$ or NR$^5$, $R^5$ is H or $C_1$–$C_4$-alkyl, Ar is an optionally substituted aromatic ring system having 5 or 6 ring members, m is 1 or 2, M is a derivative of cholesterol or cholestane or one of the groups —Ar—Ar—, —Ar—Y—Ar—, Ar—Y—Alk-, -Alk—Y—Ar—, -Alk—Ar— or —Ar—Alk-, Y is —CO—O—, —OCO—, —CONH—, —NHCO—, —N=CH—, —CH=N—, —N—NO—, C(R$^5$)$_2$-, —C(R$^5$)$_2$—C(R$^5$)$_2$-, —O— or —NR$^1$—, Alk is a straight-chain, branched or cyclic, optionally substituted, optionally olefinically unsaturated aliphatic group having 1 to 14 carbon atoms, and $X^1$ and $X^2$ are hydrogen, CN, Alk, Y—Alk, aryl, Y—Ar, —N(Alk)$_2$, halogen or NO$_2$.

Preferred side-chain polymers are those in which the main chain is a poly(meth)acrylate, P is

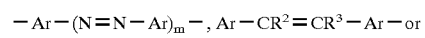

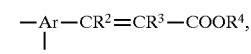

M is a radical of biphenyl, of a benzanilide or of a phenyl benzoate, and $X^1$ and $X^2$ are H, CN, $C_1$–$C_8$-alkyl, $C_1$–$C_8$-alkoxy, $C_5$–$C_7$-cycloalkoxy, phenyl, phenoxy, $C_1$–$C_4$-dialkylamino or nitro.

Particularly preferred side-chain polymers contain recurring units of the formulae

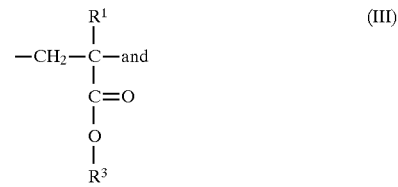
(III)

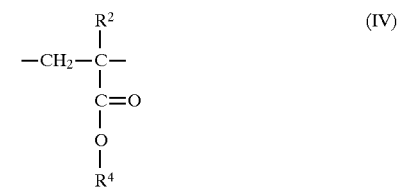
(IV)

in which $R^1$ and $R^2$, independently of one another, are H or CH$_3$, $R^3$ is

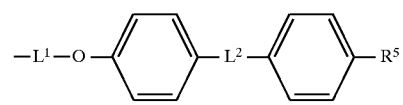

$R^4$ is

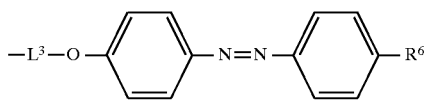

$L^1$ and $L^3$, independently of one another, are an alkylene group having 2 to 14 carbon atoms which is optionally interrupted by 1 to 3 O atoms, $L^2$ is a direct bond, —CO—NH—, —NH—CO—, —CO—O— or —O—CO— and $R^5$ and $R^6$, independently of one another, are a substituent, in particular H, CN, $C_1$–$C_6$-alkyl, $C_1$–$C_6$-alkoxy, di-$C_1$–$C_4$-alkylamino, halogen or nitro.

The side-group polymer preferably has a glass transition temperature Tg of at least 40° C. It can be measured, for example, by the method of B. Vollmer, Grindriβ der Makromolekularen Chemie, pp. 406 to 410, Springer-Verlag, Heidelberg, 1962.

The suitable side-chain polymers generally have a weight-average molecular weight of from 5000 to 500,000, preferably of from 8000 to 500,000, determined by gel permeation chromatography (calibrated with polystyrene).

The structural units of high shape anisotropy and high anisotropy of the molecular polarizability are the prerequisite for high values of the optical anisotropy. Through the structure of the polymers, the intermolecular interactions of the structural units (1) and (2) are adjusted so that the formation of liquid-crystalline ordered states is suppressed and optically isotropic, transparent, non-scattering films can be produced. On the other hand, the intermolecular interactions are nevertheless strong enough for a photochemically induced, cooperative, targeted realignment process of the photochromic and non-photochromic side groups to occur on irradiation with polarized light.

It is preferred that weak interactions occur between the side groups (1) and (2) which are sufficient for the photo-induced change in configuration of the side group (1) to cause a realignment in the same direction (known as a cooperative realignment) of the side group (2).

Extremely high values of the optical anisotropy can be induced in the optically isotropic amorphous photochromic polymers (Δn=0.01 to 0.2). The values are comparable to those obtained in monodomains of liquid-crystalline polymers, or are even larger than these. They are significantly larger than amorphous polymers not containing these structural units.

Ordered states are generated and modified in the side-chain polymers through the effect of actinic light and their optical properties are thus modulated.

The light used is preferably linear-polarized light whose wavelength is in the region of the absorption band of the side groups (1) whose configuration can be changed induced by light.

The side-group monomers can be prepared and polymerized by processes known from the literature (for example DD 276 297, DE 3 808 430, Makromolekulare Chemie 187, 1327–1334 (1984), SU 887 574, Europ. Polym. 18, 561 (1982) and Liq. Cryst. 2, 195 (1987)).

Perfect macroscopically uniform films are produced without complex alignment processes utilizing external fields/or surface effects. They can be applied to substrates by spin-coating, dipping, casting or other industrially readily controllable coating methods, introduced between two transparent plates by pressing or inflow or prepared simply as a self-supporting film by casting or extrusion. Such films can also be produced from liquid-crystalline polymers containing the structural units in the sense described by sudden cooling, i.e. by a cooling rate of >100 K/min, or by rapid stripping-off of the solvent.

The film thickness is preferably between 0.1 μm and 1 mm, in particular between 0.5 and 100 μm.

The light-induced alignment of the side groups or the writing of information is carried out by irradiation with actinic light suitable for the group whose configuration can be changed induced by light. This results in angle-dependent photoselection, which causes realignment of the photochromic groups and—through a cooperative effect—a continuous realignment of the permanently shape-anisotropic side groups in the same direction, at the most as far as perpendicularly to the electrical vector of the excitation light.

The exposure to light can be carried out over the entire area or locally with linear-polarized, coherent or non-coherent, monochromatic light whose wavelength is in the absorption region of the side groups whose configuration can be changed induced by light.

The information can be written in dot form using a laser or in unstructured form over the entire area using a laser or lamp, or using a mask at an intensity of from 0.1 to 5000 mW/cm$^2$ in a time between 0.1 and 6000 sec.

The realignment process is extremely effective. The change in birefringence Δn achievable below the Tg is preferably from 0.01 to 0.20, preferably from 0.05 to 0.10.

The high values for the photochemically induced birefringence and photochemically induced dichroism result from the molecular structure of the side groups, the cooperative mechanism of light-induced alignment to give a state of identical macroscopic alignment of the photochromic and nonphotochromic, but permanently shape-anisotropic side groups, and the overcoming of limits of the realignment process, as exist in liquid-crystalline monodomains, since the intermolecular interaction forces of the liquid-crystalline guest-host system stabilize the primary order of the ordered structure.

The preferential alignment is freely selectable; it depends merely on the choice of the direction of the electric vector of the excitation light with reference to the polymer article. At constant temperature and wavelength, the extent of the alignment is dependent merely on the incident energy, which can be varied either via the time or the output of the light source. The alignment, the birefringence and the dichroism are thus freely selectable parameters which can be reproduced precisely on repeated writing and erasing under constant boundary conditions.

The effects are temperature-dependent. This primary effect can be significantly increased in accordance with the invention by warming without the need for further exposure. When the effects in various polymers are compared, their glass transition temperature Tg serves as reference point. The magnitude of the maximum optical anisotropy that can be induced initially increases with temperature. In the case of amorphous polymers, it drops drastically in the region of the glass transition temperature. In the case of liquid-crystalline polymers frozen in the amorphous state, it also rises further above Tg with temperature, ultimately disappearing completely in the region of the clearing point.

A reproducible, defined, continuously variable, long-term-stable birefringence can be produced in the side-chain polymers. It can be displayed in transmitted, polarized light as defined contrast. When polymers whose side groups have dichroic properties are used, reproducible, defined and continuously variable dichroism of the absorption or emission can be produced correspondingly. Uniform irradiation conditions give a uniform alignment in the polymer film as a whole. On local variation of the irradiation conditions, such as energy dose and polarization direction, a film structured with respect to the preferential alignment of the side groups is produced, resulting in pixels of different optical anisotropy.

The preferential direction in the alignment distribution of the optically anisotropic film can be annulled by exposure with unpolarized actinic light and the optical isotropy along the surface normals restored. Re-irradiation with the same source, but with a modified position of the electric vector with reference to the polymer film results in a modification of the direction and magnitude of the optical anisotropy. In this way, repeated switching between different states with respect to direction and magnitude of the optical anisotropy is possible.

Based on these effects, the polymers described are in principle a medium for reversible, optical data storage. As in the production of the films, all measures for restoration of the monodomains are again unnecessary after erasure of the information.

The polymers can be used for digital or analog data storage in the broadest sense, for example for optical signal processing, for Fourier transformation and convolution or in the coherent optical correlation technique. The lateral resolution is limited by the wavelength of the reading light. It allows a pixel size of from 0.5 to 100 $\mu$m.

This property makes the polymers particularly suitable for the processing of images and for information processing by means of holograms, reproduction of which can be carried out by exposure to a reference beam. The interference pattern of two monochromatic, coherent light sources of the same phase can be stored analogously and a higher storage density obtained through the correlation between the electric vector of the light and the associated preferential direction in the storage medium. Three-dimensional holographic images can be stored correspondingly. Reading takes place by illumination of the hologram with monochromatic, coherent light. In the case of analog storage, grey scale values can be established continuously and with local resolution. Reading of information stored in analog form is carried out in polarized light, the positive or negative image can be obtained, depending on the position of the polarizers. In this case, one possibility is to utilize the film contrast produced by means of the phase shift of the ordinary and extraordinary beam between two polarizers, the planes of the polarizer advantageously forming an angle of 45° to the polarization plane of the writing light, and the polarization plane of the analyser being either perpendicular or parallel to that of the polarizer. Another possibility is to detect the deflection angle of the reading light caused by induced birefringence.

The polymers can be used as optical components which can be switched passively or optically. Thus, the high light-induced optical anisotropy can be utilized to modulate the intensity and/or polarization state of light. Correspondingly, components having imaging properties comparable to lenses or gratings can be produced from a polymer film by holographic structuring.

The amplification obtainable in accordance with the invention can be carried out by warming to a temperature which is at least the glass transition temperature and is at most $0.75 \cdot (T_c - T_g)$, preferably at most $0.6 \cdot (T_c - T_g)$, in particular at most $0.5 \cdot (T_c - T_g)$, higher than $T_g$. The best results are achieved at the maximum of the curve which describes the dependence of the efficiency on the temperature. It is polymer-dependent and can be determined in a preliminary experiment. The time taken to obtain the maximum efficiency at the selected temperature is, for a given polymer, dependent in particular on the selected temperature; it is from 10 seconds to 2 hours, preferably from 1 to 60 minutes, in particular from 5 to 30 minutes.

The amplification obtained in accordance with the invention is long-term and, if it could be monitored for that long, is stable for many months, probably for years.

EXAMPLE

The investigation was carried out on a 34 $\mu$m thick film of a copolymer comprising the monomers

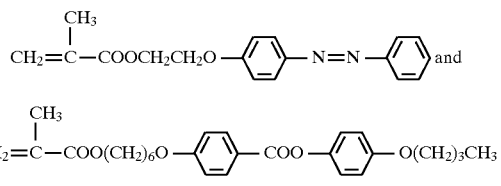

in the molar ratio 1:1, having a glass transition temperature Tg of 61° C. and a clearing point Tc of 79° C.

The source used for the writing rays was an Ar$^+$ ion laser operated at an output power of 150 mW at a wavelength of 488 nm in single frequency mode. The polarization of the laser light was given by the arrangement of the Brewster windows in the laser and was perpendicular to the experimental plate. The laser beam was divided into 2 beams of equal intensity. The two beams were caused to interfere on the sample at an angle of 10°. The holographic grating written had a grating spacing of 1.4 $\mu$m.

The laser beam was generated by a helium-neon laser (output power 10 mW) operated at a wavelength of 632.8 nm. The light was polarized in the ratio 500:1. In order to ensure a defined polarization direction, the HeNe beam passed through a polarizer which only allowed passage of the component perpendicular to the experimental plate.

The holographic grating originally written with an efficiency of 30% relaxed to a residual diffraction efficiency of 7% after storage for 2 hours in the dark. The film was then warmed in steps of 0.5° C. and, in order to distribute the temperature homogeneously, was conditioned at the new temperature for 600 seconds in each case. An increase in the efficiency was apparent even below the Tg and was followed by a sharp increase above the Tg. The efficiency reached its maximum of 37% at 67° C. and dropped back at higher temperatures.

We claim:

1. Process for amplifying the photoinduced modification of a side-chain polymer comprising a main chain and side groups branching off therefrom which comprise
   (1) at least one side group whose configuration can be changed by photoinduction and
   (2) at least one permanently shape-anisotropic side group which is different from (1)
      by heating the side-chain polymer subsequent to said photoinduced modification to a temperature which is between its glass transition temperature and its clearing point.

2. Process according to claim 1 wherein the proportion of monomer units containing side group (1) is 25 to 80 mol-% and the proportion of monomer units containing side group (2) is 20 to 75 mol-%, in each case based on the sum of all of the incorporated monomer units.

3. Process according to claim 1 wherein the side group (1) contains an —Ar(N═N—St)$_m$ unit wherein Ar is, an optionally substituted aromatic ring system having 5 or 6 ring members, and in which m=1 or 2.

4. Process according to claim 1, wherein the side-chain polymer contains monomer units from the group consisting of acrylic acid esters and methacrylic acid esters.

* * * * *